US006870083B2

(12) United States Patent
Turner

(10) Patent No.: US 6,870,083 B2
(45) Date of Patent: Mar. 22, 2005

(54) VARIABLE CONFIGURATION GUITAR BRIDGE

(75) Inventor: William T. Turner, Corona, CA (US)

(73) Assignee: Fender Musical Instruments, Scottsdale, AZ (US)

( * ) Notice: Subject to any disclaimer, the term of this patent is extended or adjusted under 35 U.S.C. 154(b) by 0 days.

(21) Appl. No.: 10/342,071

(22) Filed: Jan. 13, 2003

(65) Prior Publication Data

US 2004/0134329 A1 Jul. 15, 2004

(51) Int. Cl.⁷ .................................................. G01D 3/04

(52) U.S. Cl. ............................ 84/298; 84/307; 84/299; 84/312 R; 84/313

(58) Field of Search .......................... 84/298, 307, 299, 84/312 R, 313

(56) References Cited

U.S. PATENT DOCUMENTS

| | | | |
|---|---|---|---|
| 2,565,253 A | | 8/1951 | Melita |
| 2,714,326 A | | 8/1955 | McCarty |
| 2,740,313 A | | 4/1956 | McCarty |
| 4,069,733 A | | 1/1978 | Quan |
| 4,230,014 A | | 10/1980 | Hoshino |
| 4,334,454 A | | 6/1982 | Wall |
| 4,433,605 A | | 2/1984 | Matsui |
| 4,867,031 A | * | 9/1989 | Fender ........................ 84/313 |
| 5,503,054 A | | 4/1996 | Ellsworth et al. |
| 5,537,907 A | | 7/1996 | Rose |
| 5,750,910 A | | 5/1998 | LoJacono |
| 6,133,515 A | | 10/2000 | Hoshino |
| 6,300,550 B1 | | 10/2001 | Smith |
| 6,369,305 B1 | | 4/2002 | Powers et al. |
| 6,441,281 B1 | | 8/2002 | Rattner et al. |

* cited by examiner

*Primary Examiner*—Shih-Yung Hsieh
(74) *Attorney, Agent, or Firm*—Jan P. Weir

(57) ABSTRACT

A bridge for a musical instrument has a bridge body and a plurality of saddles disposed substantially upon the bridge body. A least a plurality of saddles are individually adjustable in height, so as to vary the height of a string supported thereby.

18 Claims, 6 Drawing Sheets

FIG. 8
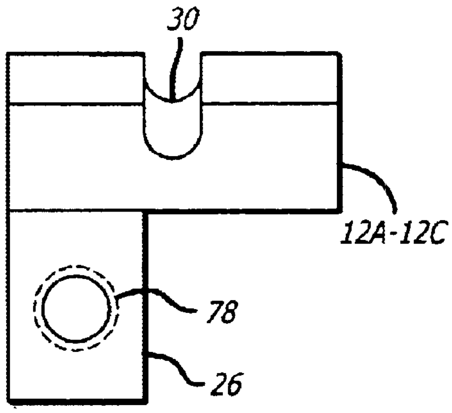
FIG. 9
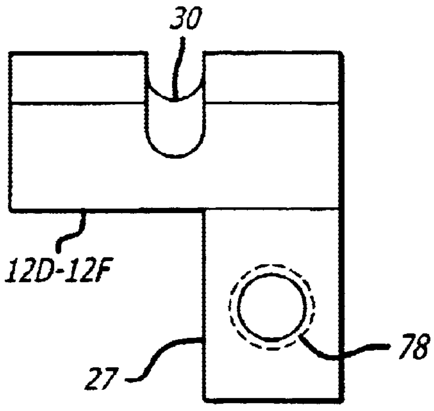
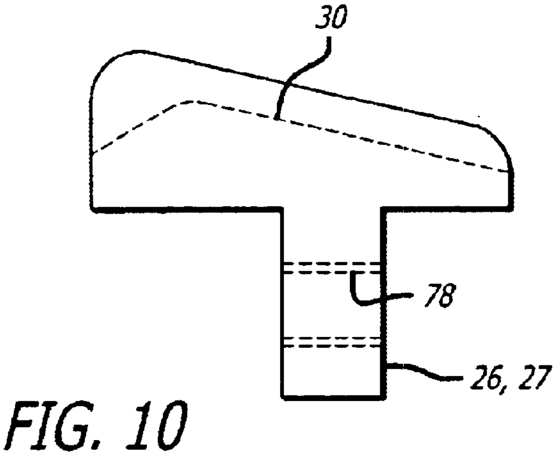
FIG. 10
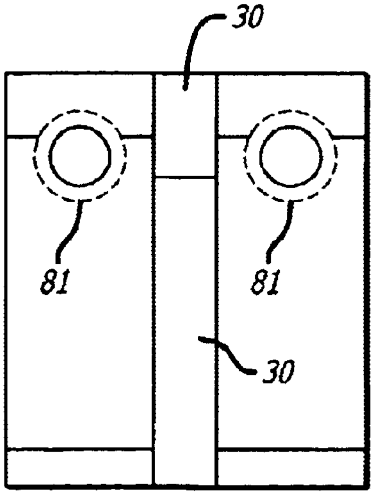
FIG. 11

VARIABLE CONFIGURATION GUITAR BRIDGE

FIELD OF THE INVENTION

The present invention relates generally to stringed musical instruments. The present invention relates more particularly to a bridge for stringed musical instruments, such as guitars, wherein the saddles of the bridge can be independently adjusted for both height and intonation.

BACKGROUND OF THE INVENTION

Stringed musical instruments, such as guitars, are well known. Other examples of stringed musical instruments include basses, banjos, mandolins, Dobros, violins and ukuleles. Such stringed musical instruments typically have a body and a neck attached to the body. A peg head is typically formed upon the distal end of the neck and the body is attached to the proximal end of the neck. Strings extend from the peg head, along the neck, to the body. Typically, the strings are attached to tuning machines mounted on the peg head and supported at the distal end of the neck by a nut. The strings are supported at the body by a bridge. On some musical instruments the strings pass over the bridge and terminate at a tailpiece. On other musical instruments the bridge and tailpiece are combined into a single structure and the strings terminate at the combination bridge/tailpiece.

Some combination bridge/tailpieces are configured to provide a tremolo effect by pivoting in a manner which increases and decreases tension on the strings. Other combination bridge/tailpieces are fixed in position and do not pivot. Although such pivoting bridges do facilitate the use of the sometimes desired tremolo effect, such pivoting bridges suffer from inherent deficiencies. Pivoting bridges can make it difficult to keep an instrument in tune, can contribute undesirable sounds to the instrument, and inhibit good contact between the vibrating strings and the body of the musical instrument.

It is difficult to maintain proper tuning of an instrument which has a pivoting bridge, because the pivoting bridge, by its very nature, allows for changes to occur in the tension of the strings. As those having skill in the art will appreciate, the pitch of a string is directly related to the tension thereof. Thus, changes in the tension of a string, due to pivoting of the bridge, inherently result in changes to the tuning of the instrument. When such changes in tension occur at times during which the tremolo effect is not being utilized, such as during manual bending of the strings to change their pitch, then undesirable changes in tuning occur. It is difficult to prevent such changes in tension from occurring at times during which the tremolo effect is not being utilized.

Prior art attempts to mitigate such undesirable changes in the tuning of an instrument having a pivoting bridge include locking the pivoting bridge in position, so as to mitigate undesirable pivoting thereof when the tremolo effect is not being utilized. However, even such locked bridges are subject to some degree of undesirable movement, which results in undesirable changes in the tuning of the musical instrument.

Pivoting bridges necessarily have additional parts (to facilitate such pivoting) which are not present in fixed bridges. Additionally, in order to facilitate such pivoting, some of these parts must be moveable with respect to one another. These additional parts and these moveable parts are generally formed of metal. The use of such additional and/or moving parts inherently facilitates undesirable modification of sound vibrations transmitted therethrough. Thus, pivoting bridges undesirably modify the sound of an instrument upon which they are installed.

Because one portion of a pivoting bridge must be pivotally attached to another portion thereof, a firm, fixed connection of the bridge to the body of the musical instrument is not provided. That is, in such a pivoting bridge, sound vibrations from the strings must travel through the pivoting connection of the bridge to get to the body of the musical instrument. Since the pivoting connection provides a much poorer sound transmission path than a fixed bridge, less sound vibration is transmitted from the strings to the body of the musical instrument when a pivoting bridge is utilized. Further, the sound vibration is undesirably modified as it is transmitted through the pivoting bridge. Some frequencies may be more readily transmitted through the pivoting bridge than are other frequencies. New frequencies may be added and existing frequencies may be attenuated by the pivoting bridge. In a similar manner, the sound vibration transmitted back from the body of the musical instrument to the strings thereof is undesirably modified when a pivoting bridge is utilized.

Those skilled in the art will appreciate that much of the desired tone of a musical instrument results from the transmission of sound from the strings, through the bridge, to the body thereof and from the body, through the bridge, back to the strings thereof. Generally, any modification of sound vibration by the bridge itself is undesirable.

A substantial portion of the sound of a musical instrument is due to overtones or harmonics which are selectively emphasized by the body of the musical instrument. In order for the body of a musical instrument to have such an effect on the sound of the musical instrument, it is necessary for string vibrations to readily pass through the bridge of the musical instrument into the body thereof and back from the body into the strings thereof. If maximum tonal response is the desired goal, then it is frequently desirable to have a fixed bridge, instead of a pivoting bridge.

Some bridges are configured so as to facilitate height adjustment of the strings. As those skilled in the art will appreciate, the height of the strings of a musical instrument, such as a guitar, determines the action thereof. That is, the height of the strings above frets of the neck of the musical instrument determines how far down each string must be pushed in order to play the string at a desired fret.

Typically, a guitar player, for example, desires to have the action as low as possible to facilitate easy playing of the musical instrument. It is easier to push a string down a shorter distance than it is to push the string down a longer distance. However, positioning the strings too close to the neck is likely to result in undesirable noise or buzz, as one or more of the strings strike the frets. Buzz is most likely to occur at the higher pitched frets, which are located near the center of the length of each string, where string excursions are greatest when the string is played. The height of the strings at which buzz occurs depends substantially upon the playing style (how hard the strings are struck or picked when played) of the player.

Frequently it is desirable to match the arc of the strings with an individual's playing style. Various aspects of an individual's playing style contribute to the desire for different amounts of arc in the strings. Such aspects of playing style include whether or not a pick is used, whether the soft ends or tips of the fingers are used or the nails of the fingers are used, and how hard the strings are picked. Personal preference also determines how much arc the strings of a musical instrument should have. Thus, it is highly desirable that the strings be adjustable in height, so as to accommodate a large number of players having diverse playing styles.

One contemporary method for varying the height of the strings of a guitar involves the selection and installation of a saddle which provides the desired string height. The saddle typically supports all six strings of the guitar and sits within a groove formed upon the bridge of the guitar. Such saddles are easily replaceable. Therefore, a player may typically select a saddle which provides the desired height of the strings, so as to provide the particular action which is appropriate for the player's style. Height adjustment of the strings by selecting and installing the appropriate saddle is a common method for adjusting string height on an acoustic guitar.

On some contemporary fixed combination bridge/tailpieces, the height thereof (including the saddle) is adjustable. Typically, such adjustability is provided by mounting the fixed combination bridge/tailpieces to the body of a guitar via two threaded height adjustment mounting bolts, wherein one threaded height adjustment mounting bolt is disposed proximate each end thereof. Adjustment of the height of the fixed combination bridge/tailpiece is effected by turning one or both of the height adjustment mounting bolts, so as to cause the fixed combination bridge/tailpiece to move closer to or further away from the body of the guitar. Height adjustment of the strings via such fixed combination bridge/tailpiece height adjustment mounting bolts is common on electric guitars.

Although the above described saddle height selection and bridge height adjustment is generally suitable for varying the height of strings above the neck of a musical instrument, such contemporary methodologies suffer from inherent deficiencies which detract from their overall effectiveness and desirability. For example, raising or lowering either the saddle or the entire bridge (including the saddle) tends to raise or lower all of the strings together.

A small degree of independent height adjustment for each string may be obtained by filing (deepening) one or more of the notches of a saddle, so as to lower a string seated within the filed notch(es). However, if a notch is filed too deep, then the entire saddle or bridge must be raised to compensate and the filing process may then need to be repeated. Thus, independent adjustment of the height of each string is not readily provided.

Further, the saddle defines the relative placement of the strings with respect to one another. That is, the shape of the supporting surface of the saddle determines whether the strings are generally coplanar with respect to one another at the bridge, or whether the strings define an arc at the bridge. If the strings define an arc at the bridge, then the saddle determines the radius of the arc.

As discussed above, contemporary saddles do not readily facilitate the independent adjustment of the height of each string and thus do not readily facilitate varying the position of the strings with respect to one another. Small changes in the position of each string relative to the other strings may be made by filing the notches of a saddle, as described above. However, filing a notch too deep again requires that the entire saddle be raised to compensate and generally also requires that the filing process be repeated. Further, it is difficult to obtain a substantial change in string position by filing.

Since the parts being filed are typically plated metal, filing is generally undesirable, because it degrades the material. Additionally, if the saddles are made of cast material, filing breaks through the surface skin of the cast material and into the softer, porous interior thereof. Having a string rest upon such softer, porous interior material of a saddle is less than optimal for desired tonal response and also tends to shorten the life of the saddle. As such, it is difficult to change the relative placement of the strings from coplanar to defining an arc and vice versa by such filing. It is also difficult to substantially alter the radius of an arc defined by the strings via filing. Thus, the position of each of the strings relative to one another is substantially predetermined by the shape of the saddle.

Contemporary fixed combination bridge/tailpieces do not facilitate independent adjustment of the height of each string. Although the overall height thereof, and consequently the height of all of the strings, is adjustable on some contemporary fixed combination bridge/tailpieces, such overall height adjustment does not facilitate changing of the curvature or arc of the strings.

However, in many instances a player would like to modify the shape of the strings at the bridge. That is, it is frequently desirable to independently change the height of each string at the bridge. In this manner, a player can not only vary the action of the strings, but can additionally provide the desired amount of curvature or arc in the strings, particularly for the higher pitched frets where the effects of such adjustments are most pronounced (because the higher pitched frets are closer to the bridge).

Some bridges are configured so as to facilitate intonation compensation. As those skilled in the art will appreciate, the intonation of a stringed musical instrument is determined by the length of that portion of each string, in relation to the placement of the frets over the predetermined scale length, which is free to vibrate when picked. Due to inherent variations in the physical properties of the strings (such as their weight distribution and flexibility), each string of a musical instrument will not necessarily have the same length when proper intonation is achieved. The length of that portion of each string which is free to vibrate is typically determined, at least in part, by the position of its corresponding saddle upon the body of the musical instrument.

By horizontally positioning each saddle of a bridge appropriately, intonation compensation for the musical instrument can be provided. On some contemporary musical instruments, intonation is adjusted by positioning a single saddle (which supports all six strings of a guitar, for example) such that the strings have approximately the necessary different lengths. Of course, on such single saddle bridges, a compromise position of the saddle must be found wherein intonation is somewhat satisfactory for all strings, but is typically not precisely achieved for at least some of the strings. When the saddle is positioned such that intonation for two of the strings of the musical instrument (such as the two end strings thereof) is proper, then intonation for the other strings thereof (such the middle strings thereof) may not be proper. Of course, moving the saddle so as to provide proper intonation for the middle strings will necessarily cause the intonation to be incorrect for the end strings. Thus, when a single saddle is utilized, a compromise position thereof must be utilized.

On other contemporary musical instruments, separate saddles are provided for each string, such that the intonation of each string can be individually adjusted or compensated for by independently horizontally positioning each saddle. Of course, such independent adjustability of the intonation of the strings desirably facilitates precise intonation adjustment thereof.

In view of the foregoing, it is desirable to provide a bridge for a musical instrument, such as a guitar, wherein each string of the musical instrument is supported by a separate, independently movable saddle, which can be independently positioned in height, i.e., vertically, so as to define the desired action of the instrument and the desired arc of the strings, and which can also be independently positioned horizontally so as to facilitate more accurate intonation adjustment.

SUMMARY OF THE INVENTION

The present invention specifically addresses and alleviates the above-mentioned deficiencies associated with the prior art. More particularly, the present invention comprises a bridge for a stringed musical instrument, wherein the bridge comprises a bridge body and a plurality of saddles disposed substantially upon the bridge body. At least a plurality, preferably all, of the saddles are individually adjustable in height, so as to vary a height of a string supported thereby.

Optionally, each saddle may also be independently adjustable for intonation.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 8 is a back view of an exemplary one of the right (as they would be mounted into the bridge body of FIG. 5) three saddles;

FIG. 9 is a back view of an exemplary one of the left (as they would be mounted into the bridge body of FIG. 5) three saddles;

FIG. 10 is a side view of an exemplary left or right saddle;

FIG. 11 is a top view of an exemplary left or right saddle;

DETAILED DESCRIPTION OF THE INVENTION

Figure 1:
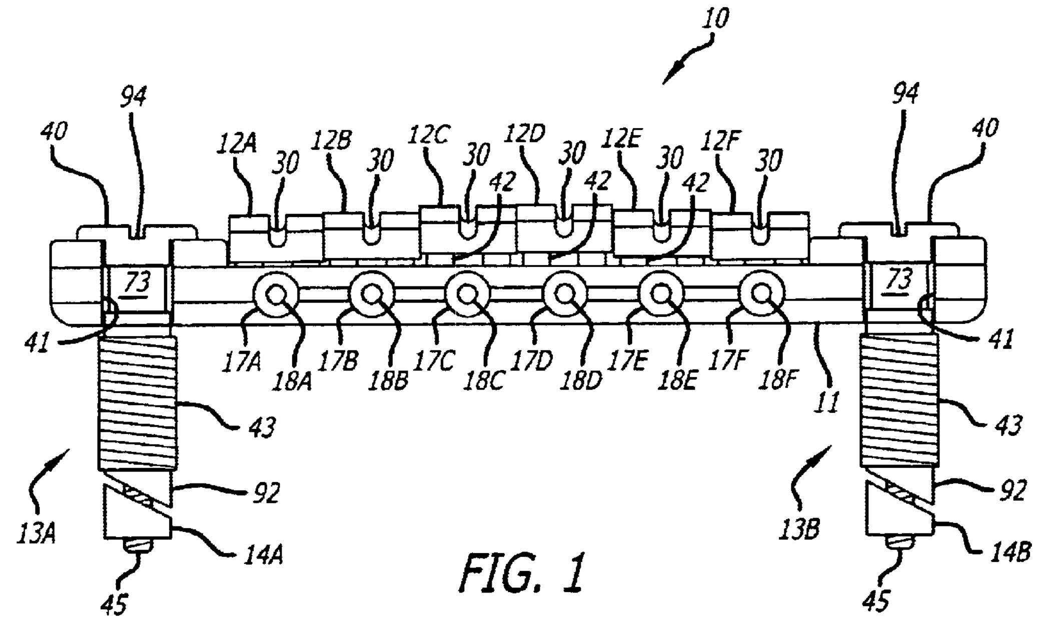
FIG. 1 is a front view (viewed from the peg head) of a variable configuration guitar bridge according to the present invention, showing the saddles thereof adjusted vertically so as to define an arc.

The detailed description set forth below in connection with the appended drawings is intended as a description of the presently preferred embodiment of the invention and is not intended to represent the only form in which the present invention may be constructed or utilized. The description sets forth the functions of the invention and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

As discussed in detail below, the present invention comprises a fixed combination bridge/tailpiece for a stringed musical instrument, such as a guitar, which comprises a bridge body and a plurality of saddles disposed substantially upon the bridge body. At least a plurality, preferably all, of the saddles are individually adjustable in height, so as to vary a string height of each string supported thereby. That is, each saddle is preferably configured so as to support only one string. Thus, the number of saddles preferably corresponds to the number of strings supported by the bridge. For example, on a six string guitar, there will preferably be six saddles which are individually adjustable in height. In this manner, the action of the strings and the arc formed thereby can easily be adjusted.

As discussed in detail below, the action of the strings can be adjusted so as to suit the playing style of a guitar player, for example. Thus, each string can be vertically positioned as close to the neck of the guitar as can be accomplished without introducing undesirable buzz. In this manner the musical instrument can be customized, so as to accommodate the playing style of a particular guitar player.

Preferably at least one more, preferably two, adjustment screws are configured to vary the height of each saddle. Preferably, one adjustment screw is disposed upon each side of a notch formed within each saddle, so as to be disposed upon each side of a string supported by the saddle. The use of two adjustment screws, with one adjustment screw disposed upon each side of the string, better supports the saddle (as compared to the use of one adjustment screw) and inhibits undesirable lateral rocking, wobbling or other movement of the saddle.

According to one aspect of the present invention, the saddles are configured so as to vary intonation of a string supported thereby. Intonation is preferably varied via an adjustment screw configured to move each saddle generally horizontally (longitudinally toward or away from the peg head).

Preferably, a support post is disposed at each end of the bridge body and the support posts are configured so as to vary the vertical height of the bridge. Each support post preferably comprises a wedge anchor for inhibiting movement of the bridge with respect to a musical instrument.

Thus, according to the present invention, the support posts may be used to coarsely adjust the vertical height of the strings, while the two string height adjustment screws of each saddle may be used to finely adjust the vertical height of the strings and to provide any desired arc thereto.

Preferably, the bridge body is configured such that the strings of the musical instrument wrap around a substantial portion thereof, as discussed in detail below. However, those skilled in the art will appreciate that various other, wrapped or non-wrapped, configurations of the bridge are likewise suitable.

Referring now to FIGS. 1–4, the bridge assembly 10 of the present invention generally comprises a bridge body 11, a plurality of saddles 12*a*–12*f* and two bridge anchor post assemblies 13*a* and 13*b*.

Figure 2:
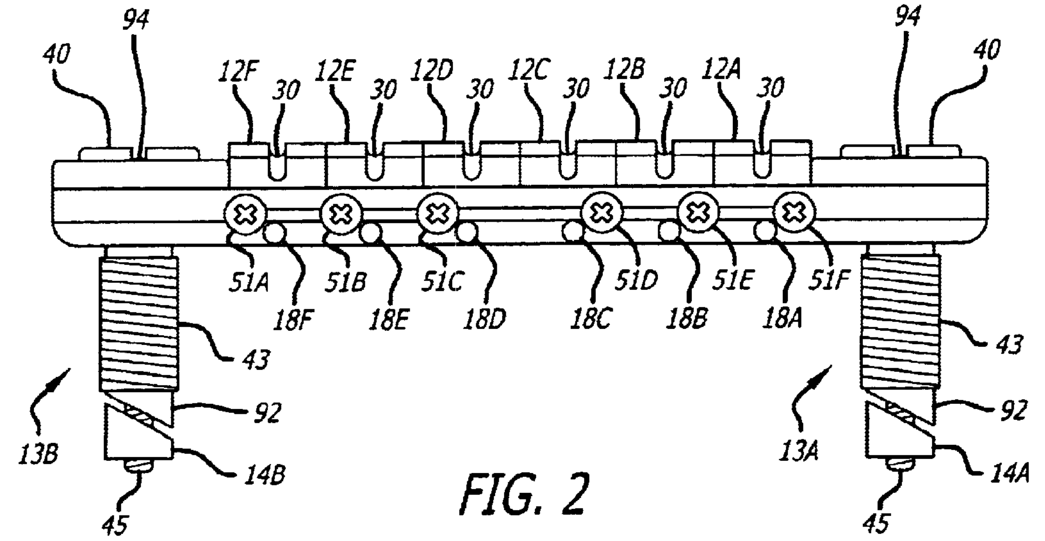
FIG. 2 is a back view of the guitar bridge of FIG. 1, showing the saddles thereof adjusted vertically so as to define a substantially straight line.
Figure 16:
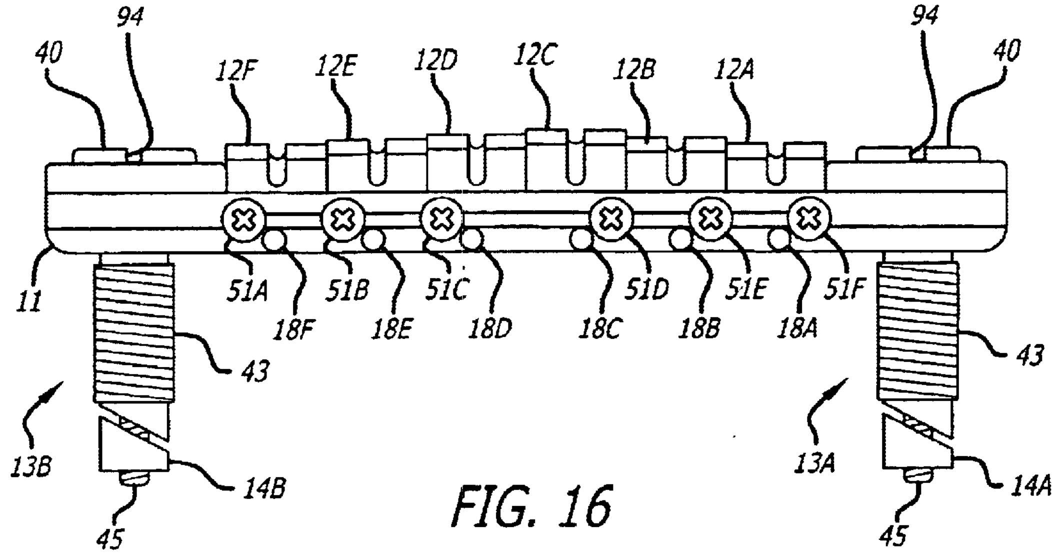
FIG. 16 is a back view of the guitar bridge of FIG. 1, showing the saddles thereof adjusted vertically so as to generally define an arc.

With particular reference to FIGS. 1, 2 and 16, bridge anchor post assemblies 13*a* and 13*b* optionally support the bridge body 11 above the body of the musical instrument and facilitate attachment of the bridge body 11 to the musical instrument. It is worthwhile to note that FIGS. 1 and 16 show the saddles 12*a*–12*f* positioned so as to cause the strings to generally define an arc, while FIG. 2 shows the saddles 12*a*–12*f* positioned so as to cause the strings to define a generally straight line. According to one aspect of the present invention, wedge anchors 14*a* and 14*b* are optionally used to inhibit movement of the bridge body 11 with respect to the body of the musical instrument, as discussed in detail below. As those skilled in the art will appreciate, various other means, including the use of epoxy, may alternatively be utilized to attach the bridge body 11 to a musical instrument. However, use of the bridge anchor post assemblies 13*a* and 13*b* is preferred, because the bridge anchor post assemblies 13*a* and 13*b* facilitate coarse height adjustment of the strings and because the anchors 14*a* and 14*b* thereof inhibit undesirable changes in this coarse adjustment.

Such vertical positioning of each individual string also allows the strings to conform to the camber or arc of the instrument's fingerboard.

A plurality of individually adjustable saddles 12*a*–12*f* are movably positioned upon the bridge body 11, such that each saddle 12*a*–12*f* can be moved horizontally to facilitate intonation adjustment and can be moved vertically so as to adjust string height at the bridge. According to the preferred embodiment of the present invention, each of the saddles 12*a*–12*f* is moveable both horizontally and vertically via the rotation of adjustment screws. However, those skilled in the art will appreciate that various other means for effecting horizontal and/or vertical movement of the saddles are likewise suitable.

As discussed in detail below, each string enters one of the counterbored holes 17*a*–17*f*, within which the bead 60 (FIG. 4) at the end of the string remains. The strings wrap around the back of the bridge assembly 10 and rest within the notches 30 of each saddle 12*a*–12*f*.

Figure 13:
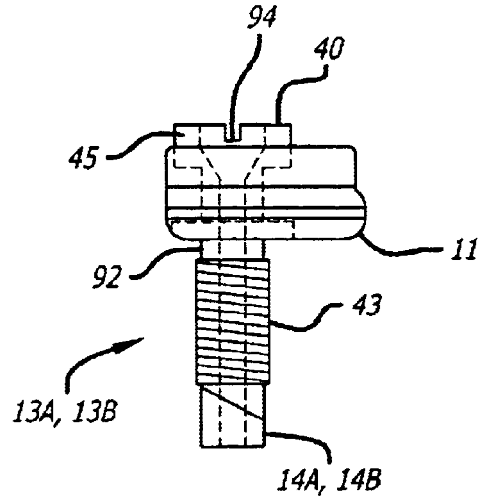
FIG. 13 is a end view (with respect to the bridge body) of a support post assembly installed onto the bridge body, wherein the support post assembly utilizes a wedge lock.
Figure 14:
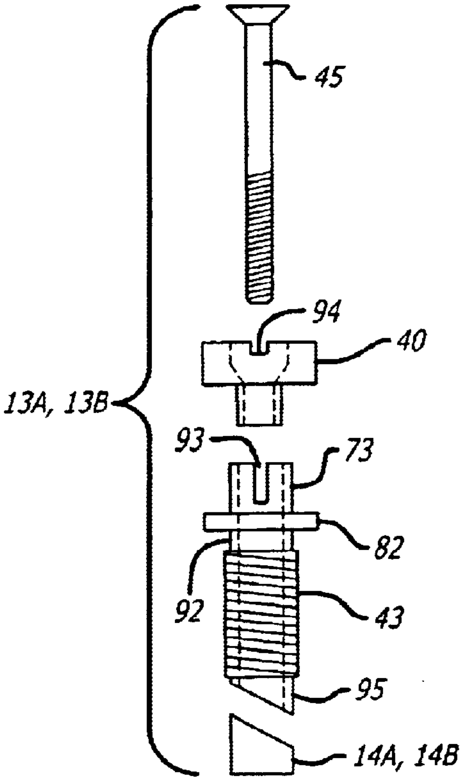
FIG. 14 is an exploded view of the support post assembly of FIG. 13.

Retainer screws 40 facilitate attachment of the bridge body 11 to the bridge anchor post assemblies 13*a* and 13*b* (as best shown in FIGS. 13 and 14) by sliding thereunto. The bridge body 11 is captured intermediate the retaining screws 40 and the lip 82, as described in detail below. Thus, tightening each wedge lock bolt 45 locks both the bridge body 11 into position with respect to the anchor post assembly 13*a* or 13*b* and locks the anchor post assembly 13*a* or 13*b* into place with respect to the instrument body 100. Each anchor post assembly 13*a* and 13*b* preferably has a necked down portion 73 (best shown in FIGS. 1 and 14) which, in cooperation with a retaining screw 40 and lip 82 (FIG. 14), facilitates capturing of an end portion of the bridge body 11. Accordingly to the preferred embodiment of the present invention, cutouts 41 are optionally formed in the bridge body 11.

Figure 15:
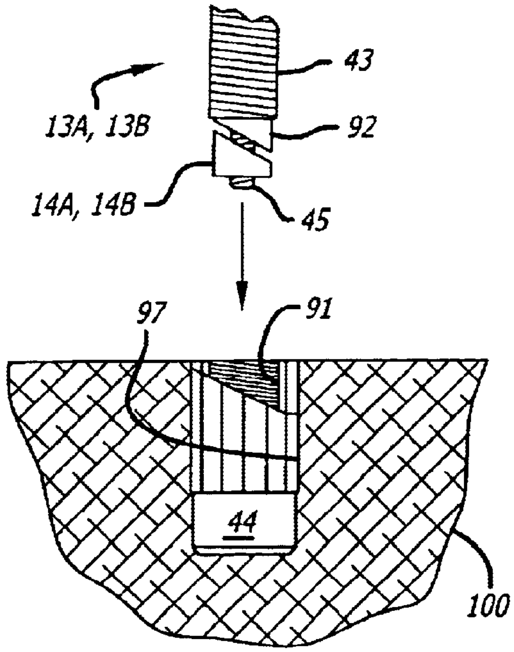
FIG. 15 is a cross-sectional side view of an anchor sleeve mounted in the body of a stringed musical instrument, such as a guitar, showing a support post assembly positioned for insertion thereinto.

External threads 43 formed upon the anchor post assemblies 13*a* and 13*b* attach the anchor post assemblies 13*a* and 13*b* to complementary threaded anchor sleeves, such as threaded anchor sleeve 44 disposed within the body 100 of a stringed musical instrument (as shown in FIG. 15). Typically, such threaded anchor sleeves 44 comprise internal threads 91 which are complementary to those of the anchor post assemblies 13*a* and 13*b* and have a knurled outer finish so as to securely attach the threaded anchor sleeves 44 in the body 100 of a stringed musical instrument. Optionally, epoxy may be utilized so as to further secure the threaded anchor sleeves 44 within the body 100 of a stringed musical instrument.

A wedge lock bolt 45 extends longitudinally through an unthreaded bore 95 (FIG. 14) formed within each anchor post assembly 13*a* and 13*b* and is threaded to wedge locks 14*a* and 14*b*, such that rotating wedge lock bolts 45 causes the wedge locks 14*a* and 14*b* to anchor each anchor post assembly 13*a* and 13*b* in position, and thus prevent further rotation thereof. That is, tightening a wedge lock bolt 45 causes the wedge lock 14*a* or 14*b* to slide along the angled or inclined surface thereof in a manner which urges the wedge lock 14*a* or 14*b* off-center with respect to the wedge lock bolt 45 and thus causes the wedge lock 14*a* or 14*b* to contact and bind against the internal threads 91 of the anchor sleeves 44.

Tightening each wedge lock bolt 45 also causes the retainer screws 40 to move closer to the lip 82, so as to capture and clamp the bridge body 11 between the retaining screw 40 and the lip 82.

The combination of such anchor post assembly 13*a* and 13*b* and the wedge anchors 14*a* and 14*b* provides enhanced coupling of sound vibrations from the strings of the musical instrument to the body thereof and from the body of the musical instrument to the strings thereof. Thus, this combination contributes substantially to a desirable enhancement of the acoustic qualities of the musical instrument.

Figure 7:
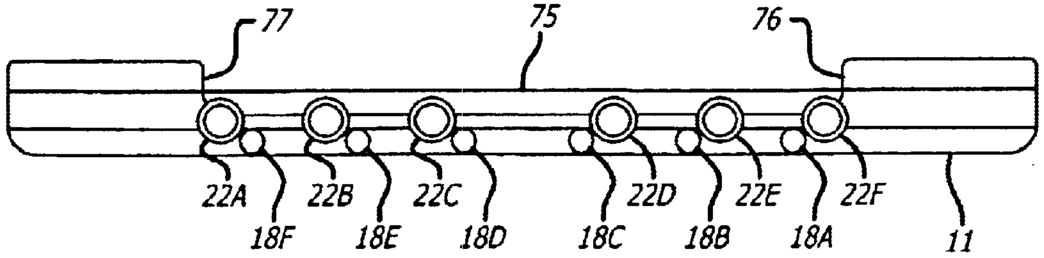
FIG. 7 is a back view of the bridge body of FIG. 5.
Figure 12:
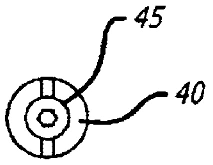
FIG. 12 is a top view of a bridge support post assembly.

With particular reference to FIG. 2, intonation adjustment screws 51*a*–51*f* are received within unthreaded intonation adjustment screw bores 22*a*–22*f* (FIG. 7). Rotation of the intonation adjustment screws 51*a*–51*f* results in horizontal movement of the corresponding saddles 12*a*–12*f*, which are threadedly attached thereto.

Figure 4:
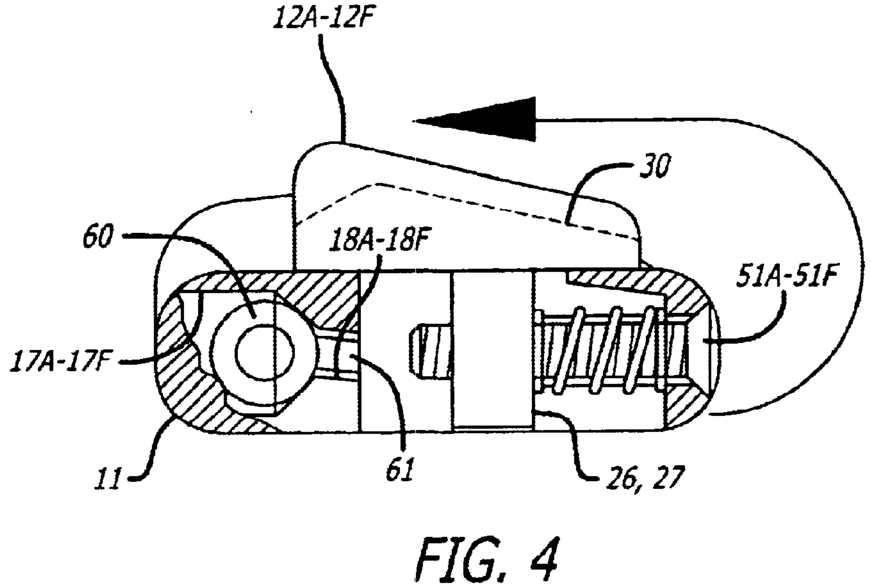
FIG. 4 is a cross-sectional view of the bridge of FIG. 1, taken at one exemplary saddle position thereof.

String passage bores 18*a*–18*f* facilitate passage of the strings 61 from the counterbored holes 17*a*–17*f* (FIGS. 1 and 6) through the bridge body 11, such that the strings may wrap around the back of the bridge body 11 and rest within the notches 30 of each saddle 12*a*–12*f* (as best shown in FIG. 4).

Figure 3:
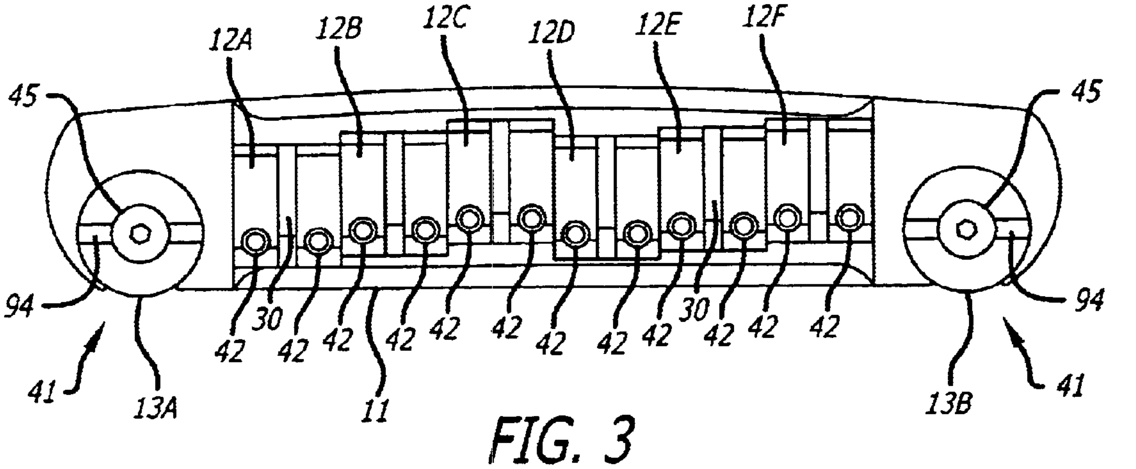
FIG. 3 is a top view of the bridge of FIG. 1, showing the saddles offset horizontally with respect to one another, as might be the result of a typical intonation adjustment.

With particular reference to FIG. 3, saddle height adjustment screws 42, preferably two for each saddle 12*a*–12*f*, facilitate independent height adjustment of each saddle 12*a*–12*f*.

With particular reference to FIG. 4, the bead 60 of a string 61 is disposed within an exemplary counterbored hole 17*a*–17*f* formed in the bridge body 11. The string 61 extends through an exemplary string passage 18*a*–18*f* from which the string is wrapped around the bridge body 11, such that the string 61 rests within the notch 30 of an exemplary saddle 12*a*–12*f*, as shown by the arrow.

Figure 5:
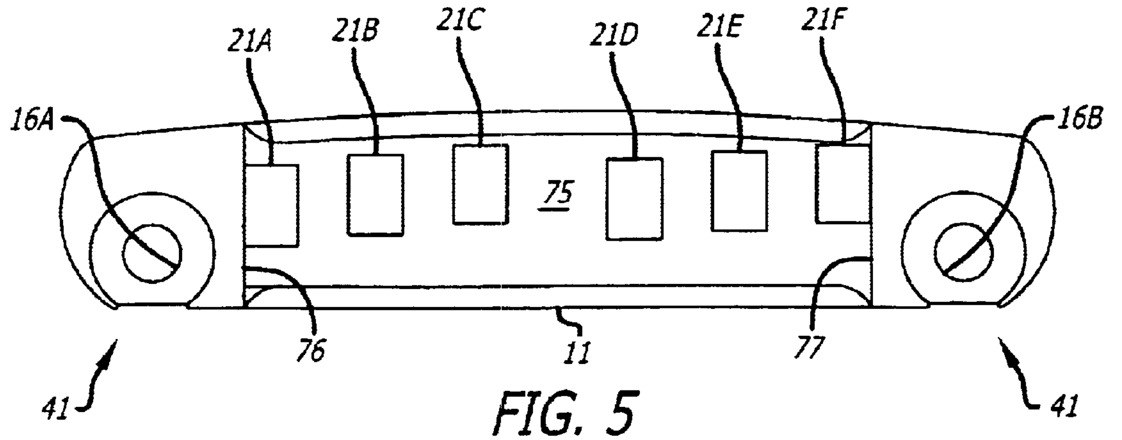
FIG. 5 is a top view of the bridge body of FIG. 1, having the saddles and support post assemblies removed therefrom.
Figure 6:
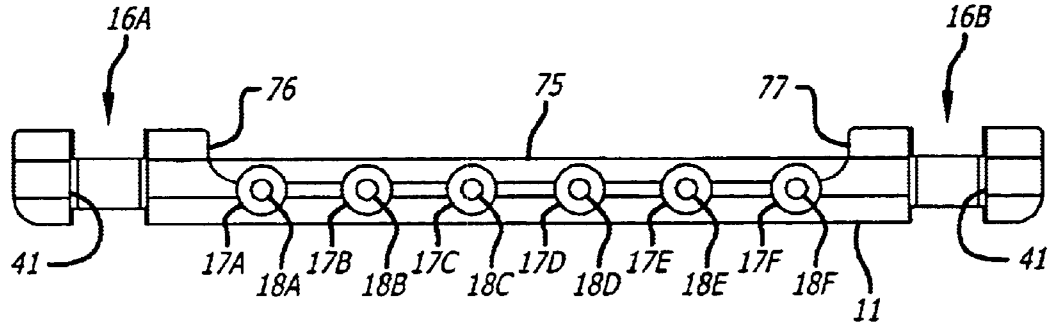
FIG. 6 is a front view of the bridge body of FIG. 5.

Referring now to FIGS. 5–7, the bridge body 11 is shown with the saddles 12*a*–12*f*, the intonation adjustment screws

51*a*–*f*, and the bridge anchor posts 13*a* and 13*b* removed therefrom. Slots 21*a*–21*f* are configured to slidably receive the posts 26, 27 (FIGS. 8 and 9) of the saddles 12*a*–12*f*.

The post 26 and 27 of the saddles 12*a*–*c* and 12*d*–*f*, respectively, extend downwardly through the slots 21*a*–21*f* in the bridge body 11 and are held in place via intonation adjustment screws 51*a*–51*f* (FIGS. 2 and 4), which are threaded into threaded openings 78 of the post 26 and 27.

With particular reference to FIG. 6, the planar surface 75 formed upon the bridge body 11 cooperates with stops 76 and 77 formed at opposed ends thereof to capture the saddles 12*a*–12*f*, and thus prevent undesirable rotation or other movement of the saddles 12*a*–12*f*.

With particular reference to FIG. 7, the string passages 18*a*–18*f* are shown where the string exits the bridge body 11, so as to wrap thereabout as shown in FIG. 4 and discussed above.

Referring now to FIGS. 8–11, two exemplary saddles are shown. One exemplary saddle is representative of saddles 12*a*–12*c* and thus has post 26 formed at the left thereof, as viewed from the back in FIG. 8. Another exemplary saddle is representative of saddles 12*d*–12*f* and thus has a post 27 formed upon the right thereof, as viewed from the back in FIG. 9. FIGS. 10 and 11 may be considered generic to both types of saddles. As discussed above, the saddles 12*a*–12*c* are formed to fit within the three left slots 21*a*–21*c* of the bridge body 11 and the saddles 12*d*–12*f* are formed so as to fit within the slots 21*d*–21*f* of the bridge body 11.

Each saddle 12*a*–12*f* comprises a notch 30 configured such that a string may rest thereupon. Optionally, each notch 30 may be configured so as to accommodate a particular gauge of string. Alternatively, each notch 30 may be configured so as to accommodate a wide range of string gauges.

With particular reference to FIG. 10, the threaded bore 78 formed in the posts 26 and 27 receives the intonation adjustment screws 5*la*–51*f*, so as to facilitate adjustment of the horizontal position of each saddle 12*a*–12*f*, and thus facilitate intonation adjustment. Rotating one of the intonation adjustment screws 51*a*–51*f* causes the attached saddle 12*a*–12*f* to slide within its respective slot 21*a*–21*f* in a manner which changes the length of the string supported thereby and thus varies the intonation of that string.

With particular reference to FIG. 11, threaded bores 81 are formed vertically within each saddle 12*a*–12*f* and received height adjustment screws 42 (FIG. 3), so as to facilitate individual height adjustment of each string, as discussed below.

Referring now to FIGS. 12–15, the anchor post assemblies 13*a* and 13*b* are shown in further detail. Bridge retainer screw 40 captures a portion of the bridge body 11 between itself and a lip 82 of bridge height adjustment screw 92, as shown in FIG. 13. Wedge lock bolt 45 is threaded into wedge 14*a*, 14*b* such that tightening wedge lock bolt 45 causes the wedge 14*a*, 14*b* to lock the anchor post assembly 13*a*, 13*b* into position and thus prevent further rotation, as discussed above.

With particular reference to FIG. 15, each anchor sleeve 44 is disposed within a bore 97 formed within the body 100 of a stringed musical instrument, such as a guitar. Each anchor sleeve 44 comprises internal threads 91 which receive external threads 43 of an anchor post 13*a*, 13*b*. Thus, rotation of the bridge height adjustment screw 92, such as by inserting a screw driver or the like into a slot 93 thereof, results in vertical movement of the anchor post assembly 13*a*, 13*b*, so as to facilitate coarse adjustment of the height of the bridge assembly 10.

It is worthwhile to note that rotation of a bridge height adjustment screw 92 is effected by insertion of a screw driver or the like into slot 93 thereof, while tightening of the retainer screw 40 is similarly effected by insertion of a screw driver or the like into slot 94 thereof. Coarse height adjustment of the bridge is performed with the bridge retainer screws 40 removed, so as to expose the slots 93 of the bridge height adjustment screws 92. After coarse height adjustment has been performed, then the bridge retainer screws 40 can be threadedly attached to the bridge height adjustment screws 92 and the wedge lock bolts 45 then inserted through both the bridge retainer screws 40 and the bridge height adjustment screws 92, so as to engage the wedges 14*a* and 14*b* and thus facilitate locking of the anchor post assemblies 13*a* and 13*b* into a desired position, i.e., a position which places the bridge body 11 at the desired height.

Figure 17:
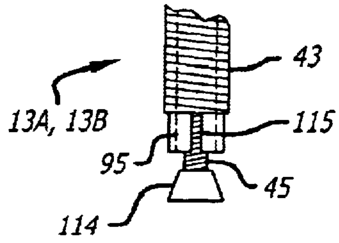
FIG. 17 is an end view (with respect to the bridge body) of a support post assembly installed onto the bridge body, wherein the support post assembly utilizes a conical lock.
Figure 18:
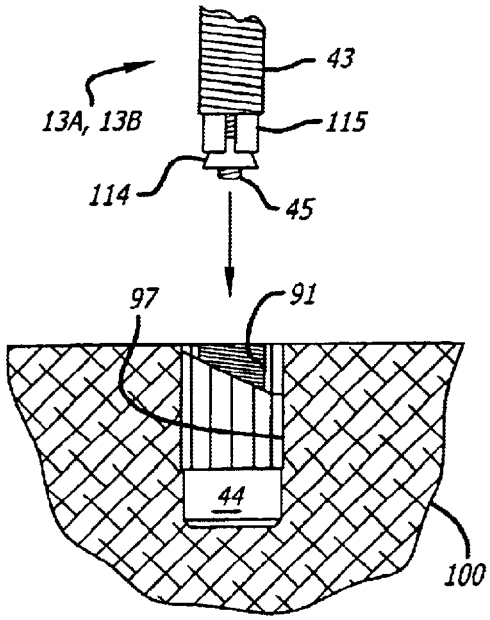
FIG. 18 is an exploded view of the support post assembly of FIG. 17.

Referring now to FIGS. 17 and 18, the anchor post assemblies 13*a* and 13*b* may alternatively comprise conical nuts 114, rather than the wedges 14*a*, 14*b* of FIGS. 13 and 14. Such conical nuts 114 are threaded so as to engage bolts 45. Tightening of bolts 45 thus draws conical nuts 114 into corresponding bores 95.

According to this alternative configuration, each anchor post assembly 13*a*, 13*b* comprises at least one slit 115 which facilitates expansion of the bottom end of each anchor post assembly 13*a*, 13*b* as the conical nut 114 is drawn into the bore 95 thereof. Such expansion of the bottom end of each anchor post assembly 13*a*, 13*b* locks each anchor post assembly 13*a*, 13*b* into position within its corresponding anchor sleeve 44 (FIG. 18).

The conical nuts 114 are preferably generally frustoconical in configuration. However, those skilled in the art will appreciate various other configurations of the conical nuts 114 are likewise suitable. For example, a conventional hexagonal nut having a suitable taper formed thereon may alternatively be utilized. As a further alternative, a spherical or hemi-spherical nut may be utilized. Indeed, any configuration of the nut which effects expansion of the lower end of an anchor post assembly 13*a*, 13*b* is contemplated.

It is important to appreciate that the anchor post assembly 13*a*, 13*b* (whether of the wedge type or of the conical-nut type) of the present invention has applications other than for the attachment of a bridge to a musical instrument. The anchor post assembly 13*a*, 13*b* of the present invention may be used to attach various different structures to one another, particularly wherein it is desirable to capture one of the structures (such as in the manner that the bridge 11 is captured between the retainer screw 40 and lip 82) and wherein it is desirable to be able to adjust the distance between the two structures being attached to one another.

Moreover, the locking mechanisms (both the wedge 14*a*, 14*b* and the conical nut 114) offer substantial advantages with respect to contemporary locking mechanisms. For example, one such contemporary locking mechanism for attaching the bridge to a bridge support post comprises side mounted set screws disposed within threaded holes formed within the bridge such that tightening the set screws locks the bridge to the support posts and tends to bend the support posts in a manner which inhibits turning thereof, so as to inhibit changing of the height adjustment thereof. However, this contemporary locking of the height adjustment of the bridge applies undesirable stresses to the anchor sleeve. These undesirable stresses tend to cause the anchor sleeve to loosen and potentially detach from the musical instrument body. These undesirable stresses may also cause cracking or other damage to the musical instrument body. Thus, the contemporary use of set screws as a fastening method for locking the bridge in place with respect to the support posts and for inhibiting rotation of the support posts to similarly inhibit changes in the height adjustment suffer from the serious drawback that the post and their corresponding threaded inserts are deformed under the pressure of the set screws acting upon the posts.

Another contemporary method for mounting a bridge to a musical instrument such that the bridge is adjustable in height comprises the use of an externally and internally threaded mounting post having a cap screw attached thereto via the internal threads thereof. However, according to this system for mounting a bridge, the mounting post must generally be adjusted prior to fastening the bridge to the mounting post. Although it is possible to perform height adjustment with the bridge attached when utilizing such a system, an open end wrench must be employed.

An advantage of utilizing the mounting post of the present invention is that height adjustments, securing the post to the bridge, and securing the post to the threaded body insert, are all provided within the anchor post assemblies 13*a* and 13*b* themselves.

Preferably, the anchor post assemblies 13*a* and 13*b* are pre-assembled to define a single unit which is threaded into the threaded insert 44. Each anchor post assembly 13*a*, 13*b* may then be adjusted up or down within the threaded insert 44 by turning a flat head screwdriver which has been inserted into the slot 93 thereof. After the anchor post assembly 13*a*, 13*b* has been adjusted to a desired height with respect to the threaded insert 44, then the anchor post assembly can be secured at the desired height by engaging the wedge anchor lock 14 or the conical nut 114 by tightening the lock bolt 45. As the lock bolt 45 is tightened, the wedge 14 or the conical nut 114 jams the anchor post assembly 13*a*, 13*b* with respect to the threads of the threaded insert 44. This jamming inhibits undesirable rotation of the anchor post assembly 13*a*, 13*b*, and thus inhibits undesirable changes in the height adjustment of the bridge 11.

Tightening the lock bolt 45 also forces the post components to lock into place, and thus resist movement due to any vertical forces placed upon the post. No lateral pressure is applied to the anchor post assemblies 13*a* and 13*b* or to the threaded inserts 44. Thus, undesirable deformation and potential damage to the musical instrument is substantially mitigated.

Having thus described the structure of the variable configuration bridge of the present invention, it may be beneficial to further discuss the use thereof in further detail. Preferably, height adjustment is performed prior to performing intonation adjustment. As those skilled in the art will appreciate, adjusting the height of a string may cause some slight change in the length thereof, thereby undesirably varying the intonation adjustment. Therefore, it is preferred that height adjustment be performed prior to intonation adjustment.

Height adjustment is typically performed in two steps. First, coarse height adjustment is performed utilizing the four post assemblies 13*a* and 13*b*. Next, fine height adjustment is performed utilizing the height adjustment screws 42.

Coarse height adjustment results in movement of the entire bridge assembly 10, such that the height of all of the strings is generally affected. As discussed above, the bridge lock bolts 45 and the bridge retainer screws 40 are removed to expose slots 93 in the bridge height adjustment screws 92. Then, the height adjustment screws 92 of each anchor post assembly 13*a* and 13*b* are rotated until the desired height of the bridge body 11, and consequently the desired height of the individual saddles 12*a*–12*f*, is obtained. After the desired height of the bridge body 11 is obtained, then the bridge retainer screws 40 and the wedge lock bolts 45 are replaced in the anchor post assemblies 13*a* and 13*b*. The bridge height adjustment screws 92 are preferably locked in position by tightening wedge lock bolts 45. As discussed above, tightening wedge lock bolts 45 causes the wedge locks 14*a* and 14*b* to bind against the internal threads 91 of their corresponding anchor sleeves 44, such that further rotation of the height adjustment screws 92 is inhibited.

After the coarse height adjustment has been completed, then the height and/or arc of each individual string is adjusted by rotating the height adjustment screws 42 of each saddle 12*a*–12*f*, so as to cause each saddle 12*a*–12*f* to have the desired height and define the desired arc.

During fine height adjustment, rotation of the height adjustment screws 42 causes their corresponding saddles 12*a*–12*f* to move up or down, so as to vary the height of the strings supported thereby. Both height adjustment screws 42 of each saddle 12*a*–12*f* must generally be rotated, so as to effect such height adjustment. When the desired height is obtained, both adjustment screws 42 should be firmly in contact with the planar surface 75 of the bridge body 11, such that undesirable lateral rocking of the saddle 12*a*–12*f* is inhibited.

As shown in FIG. 2, each saddle 12*a*–12*f* is adjusted so as to have approximately the same height. Such adjustment of the saddles 12*a*–12*f* results in a generally planar configuration of the strings at the bridge assembly 10.

Alternatively, the saddles may be adjusted so as to define an arc, as shown in FIGS. 1 and 16. Thus, by individually adjusting the height of each saddle 12*a*–12*f*, a desired arc may be formed in the strings at the bridge assembly 10. In this manner, individual adjustment of the height of the saddles 12*a*–12*f* facilitates adjustment of both the action and the arc, so as to accommodate an individual player's preferences.

Once fine height adjustment of the individual saddles 12*a*–12*f* has been completed, then intonation can be adjusted, if necessary.

As shown in FIG. 3, the individual saddles 12*a*–12*f* vary substantially in the horizontal positioning thereof. That is, some of the saddles, such as saddles 12*c* and 12*f*, are positioned more to the rear than other saddles and thus cause the strings supported thereby to be longer in length than the strings supported by the other saddles. The horizontal position of each saddle is varied by rotating the corresponding intonation adjustment screw 51*a*–51*f* (FIG. 2). As each intonation adjustment screw 51*a*–51*f* is rotated, its threaded engagement with the corresponding saddle 12*a*–12*f* causes the corresponding saddle to move horizontally within its associated slot 21*a*–21*f* of the bridge body 11, so as to vary the horizontal position thereof.

Thus, the present invention facilitates independent adjustment of the horizontal and vertical positions of each string at the bridge, so as to provide desired action, string arc, and intonation adjustment.

It is understood that the exemplary variable configuration bridge described herein and shown in the drawings represents only a presently preferred embodiment of the invention. Various modifications and additions may be made to such embodiment without departing from the spirit and scope of the invention. For example, those skilled in the art will appreciate that various other means for independently varying the height of each saddle may be utilized. For example, only a single height adjustment screw may be utilized for each saddle. Further, the height adjustment screws may be threadedly attached to the bridge body 11 and configured such that they urge each saddle to move vertically when turned. Further, those skilled in the art will appreciate that the strings need not wrap around the bridge body, but rather may attach to the bridge body in various other manners. Thus, these and other modifications and additions may be obvious to those skilled in the art and may be implemented to adapt the present invention for use in a variety of other applications.

What is claimed is:

1. A fixed combination bridge/tailpiece for a stringed musical instrument, the fixed combination bridge/tailpiece comprising:

a bridge body;

a plurality of saddles disposed substantially upon the bridge body; and wherein at least a plurality of the saddles are individually adjustable in height, so as to vary a height of strings supported thereby a support post at each end of the bridge body, each support posts comprising a wedge anchor or a conical nut for inhibiting movement of the bridge with respect to a musical instrument and each support post configured to lock the bridge thereto.

2. A fixed combination bridge/tailpiece for a guitar, the fixed combination bridge/tailpiece comprising:

a bridge body configured for attachment to a guitar, the bridge body having a top, a bottom, a side which faces toward a peg head of the guitar, a side which faces away from the peg head of the guitar, and two ends, the bridge body comprising:

a plurality of counterbored holes formed in the side facing toward the peg head;

a corresponding plurality of bores which extend from the counterbored holes to the side facing away from the peg head;

a corresponding plurality of elongate openings which extend from the top toward the bottom thereof;

a corresponding plurality of holes formed in the side facing away from the peg head and intersecting the elongate openings;

a generally planar surface formed centrally upon the top and a stop formed upon the top proximate each end thereof, the planar surface cooperating with the stops to define a saddle mounting surface;

a corresponding plurality of saddles movably disposed generally on the saddle mounting surface such that each saddle can move toward or away from the side of the bridge body which faces the peg head to facilitate intonation adjustment and such that each saddle can move toward and away from the top of the bridge body to facilitate the height adjustment, each saddle comprising:

a post which extends into one of the elongate openings of the bridge body, each post having a threaded aperture formed therein for receiving an intonation adjustment screw which is substantially disposed within one of the holes formed in the side of the bridge body facing away from the peg head;

a notch configured to support a string of the guitar;

one saddle height adjustment screw disposed on each side of the notch such that turning at least one of the saddle height adjustment screws varies a height of the saddle;

a bridge height adjustment screw disposed proximate each end of the bridge body and attached to a wedge anchor for varying a distance between the bridge body and a body of the guitar, so as to simultaneously vary a height of all of the strings; and wherein the bridge body and saddles are configured such that a bead of a guitar string can be disposed with one of the counterbored holes and the guitar string can extend through one of the bores and then wrap around the bridge body such that the string is supported by a notch of one of the saddles.

3. A guitar comprising:

a guitar body;

a neck attached to the guitar body;

a plurality of strings extending substantially along the neck and the guitar body;

a fixed combination bridge/tailpiece attached to the guitar body for supporting the strings, the fixed combination bridge/tailpiece comprising:

a bridge body;

a plurality of saddles disposed substantially atop the bridge body, wherein the bridge body is adjustable in height and each saddle is individually adjustable in height, so as to vary a height of a string supported thereby; and a support post at each end of the bridge body, each support posts comprising a wedge anchor for inhibiting movement of the bridge with respect to a musical instrument.

4. A device for attaching a bridge to a musical instrument, the device comprising:

a support post;

a wedge anchor attached to the support post; and wherein the support post is configured to support a bridge.

5. The device of claim 4, wherein the support post is threaded such that a distance between the bridge and a musical instrument can be varied, so as to adjust a height of strings of the musical instrument.

6. The device of claim 4, further comprising a retaining screw having a head and being threaded to the support post, the retaining screw being configured to capture a portion of the bridge between the head thereof and a flange of the support post.

7. A device for attaching a bridge to a musical instrument, the device comprising:

a wedge anchor;

a bridge support post attached to the wedge anchor; and wherein the wedge anchor inhibits movements of the bridge with respect to the musical instrument and wherein the bridge support post is configured to facilitate adjustment of a height of the bridge.

8. The device as recited in claim 7, further comprising a single screw for each bridge post configured to both engage the wedge anchor of the bridge post and attach the bridge to the bridge support post.

9. The bridge as recited in claim 8, wherein the bridge body and the two wedge anchors are configured for use on a guitar.

10. A bridge for a musical instrument, the bridge comprising:

a bridge body; and two wedge anchors attached to the bridge body for inhibiting movement of the bridge with respect to the musical instrument.

11. A guitar comprising:

a guitar body;

a bridge, the bridge comprising:

a bridge body; and two wedge anchors attached to the bridge body for inhibiting movement of the bridge with respect to a musical instrument.

12. The method as recited in claim 11, further comprising attaching a bridge body to the anchor wedges.

13. A method for anchoring a bridge to a musical instrument, the method comprising:

providing a musical instrument having two threaded holes formed therein;

inserting wedge anchors into the threaded holes; and tightening a screw of each wedge anchor so as to cause each wedge anchor to anchor to the musical instrument.

14. A method for assembling a musical instrument, the method comprising:

providing a body of the musical instrument; and attaching a bridge to the body of the musical instrument via threaded fasteners and anchor wedges.

15. A method for assembling a guitar, the method comprising:

providing a guitar body: and attaching a bridge to the guitar body via threaded fasteners and anchor wedges.

16. A device for attaching a bridge to a musical instrument, the device comprising:

a bridge support post;

an anchor attached to the bridge support post; and a single screw configured to both attach the bridge to the support post and engage the anchor so as to lock the support post to a body of the musical instrument.

17. The device as recited in claim 16, wherein the anchor comprises a wedge anchor.

18. The device as recited in claim 16, wherein the anchor comprises a conical nut.

* * * * *